United States Patent
Tidwell et al.

(10) Patent No.: US 7,225,139 B1
(45) Date of Patent: May 29, 2007

(54) TROUBLE TRACKING SYSTEM AND METHOD

(75) Inventors: Gary R. Tidwell, Birmingham, AL (US); Jeffrey P. Ray, Birmingham, AL (US)

(73) Assignee: Bellsouth Intellectual Property Corp, Wilmington, DE (US)

( * ) Notice: Subject to any disclaimer, the term of this patent is extended or adjusted under 35 U.S.C. 154(b) by 328 days.

(21) Appl. No.: 09/604,316

(22) Filed: Jun. 27, 2000

(51) Int. Cl.
*G06F 9/46* (2006.01)
(52) U.S. Cl. ............................................. 705/8; 705/9
(58) Field of Classification Search .................... 705/1, 705/7, 8, 9
See application file for complete search history.

(56) References Cited

U.S. PATENT DOCUMENTS

| | | | |
|---|---|---|---|
| 5,446,880 A * | 8/1995 | Balgeman et al. ............ 707/9 |
| 5,666,481 A | 9/1997 | Lewis |
| 5,692,030 A * | 11/1997 | Teglovic et al. .............. 379/14 |
| 6,032,184 A | 2/2000 | Cogger et al. |
| 6,219,648 B1 * | 4/2001 | Jones et al. .................... 705/8 |
| 6,370,231 B1 * | 4/2002 | Hice ....................... 379/32.01 |
| 6,389,426 B1 * | 5/2002 | Turnbull et al. ............ 707/102 |
| 6,445,774 B1 * | 9/2002 | Kidder et al. .............. 379/9.03 |
| 6,449,341 B1 * | 9/2002 | Adams et al. .................. 379/9 |
| 6,516,055 B1 * | 2/2003 | Bedeski et al. .......... 379/32.01 |
| 6,732,167 B1 * | 5/2004 | Swartz et al. ................ 709/223 |
| 6,763,333 B2 * | 7/2004 | Jones et al. ..................... 705/8 |
| 6,813,278 B1 * | 11/2004 | Swartz et al. ............... 370/466 |
| 6,859,783 B2 * | 2/2005 | Cogger et al. ................ 705/10 |

FOREIGN PATENT DOCUMENTS

JP  2000066998 A  *  3/2000

OTHER PUBLICATIONS

"Eftia Delivers Problem Resolution System for Telecom Service Management Excellence", PR Newswire; New York; Jun. 22, 1999 (from Proquest).*
"Peregrine Systems Forms Alliance with Mitsubishi Electronics America; Integrated Enterprise Applications to Be Developed", PR Newswire, Oct. 27, 1999. (from Dialog).*

* cited by examiner

*Primary Examiner*—Catherine Tarae
*Assistant Examiner*—Johnna Loftis
(74) *Attorney, Agent, or Firm*—Wither & Keys, LLC

(57) ABSTRACT

A trouble ticket tracking system and method including a server in communication with an electronic network and a database for storing trouble tickets in communication with the server. A user computer is in communication with the network and has access, via a graphical user interface (GUI), to the server. The graphical user interface includes at least one screen which is operable to enter a new trouble ticket along with (i) a person responsible for resolving the ticket and (ii) a severity level for the trouble ticket, and to store the trouble ticket in the database. A paging system is also in communication with the server and when the severity level associated with a new trouble ticket is above a predetermined threshold, the server automatically initiates a call to the person responsible via the paging system. A duplicate ticket search engine is also preferably included to identify actual or potential duplicate trouble tickets, list any such duplicates and permit deletion thereof or a flagging thereof whereby when a representative ticket is closed out, the duplicate trouble ticket is also closed out.

31 Claims, 10 Drawing Sheets

FIGURE 2

TTS – Detail Display – Problem (Adding a New Ticket)

Main Inquiry  Text Fields

Sites
☑ AL
☐ JAC
☐ FTL
☐ MIA
☐ ATL
☐ MAC
☐ KY
☐ LA
☐ MS
☐ NC
☐ SC
☐ TN

Status
Of  Open ▼
By  RAY, JEFF
Date  02/10/2000

Closed Date  00/00/0000  Date  02/10/2000

Entered By  RAY, JEFF

Person Responsible
RAY, JEFF ▼
Target Date  00/00/0000

RF6355 Date  00/00/0000

AI - Validation  AI - Valid ▼
☐ Contacted

Brief Description  TEST

[Email] [Add] [Copy] [Delete] [Save] [Cancel] [Print] [Edit] [Close]

| | | CBS Trouble Tracking System (20 tickets retrieved) | |
|---|---|---|---|
| File | Report | Windows | Help |

Ticket | Problem ▼ | ▼ Query | ▼ Display

| ID | Entry Data | Brief Description |
|---|---|---|
| 145 | 05/16/1996 03:25 PM | INTRALATA/INTERSTATE LTM CALLS BILLED INCORRECTLY AS TOLL TO LANDLINE CUSTOMER |
| 96639 | 03/25/1997 12:50 PM | BSLD ACCOUNT #1 DURATION OF CALLS IS INCORRECT |
| 100937 | 04/11/1997 03:24 PM | BSLD ACCT 31 CALLS NOT GIVEN DISCOUNT FOR TERM PLAN |
| 102099 | 05/01/1997 04:11 PM | RELEASE 97.A/ OLEC: USAGE ON MP-4027 |
| 102104 | 05/02/1997 08:14 PM | MONTHLY SETTLEMENT REPORT NOT CREATED FOR .NET |
| 102893 | 05/16/1997 03:13 PM | UF027 ERRORS – KAPLAN |
| 105141 | 05/19/1997 05:07 PM | WATSSAVER ON WATS & TOOL FREE DIALING |
| 106771 | 06/02/1997 04:01 PM | UF038 ERRORS ON PBC ACCTS IN N.C. |
| 106012 | 06/05/1997 02:06 PM | RELEASE 97.A – DIFFERENCE BETWEEN RATING & MAVRIC BILLING 800 USAGE |
| 112846 | 06/11/1997 03:45 PM | INCREASE IN MOU IN CELLULAR (MP-3108) |
| 113345 | 06/18/1997 02:58 PM | PLAN RECORD WAS NOT SENT TO BSLD VIA CIF |
| 113457 | 06/20/1997 09:52 AM | UBO – NEED TO HAVE NEW RALEIGH EXCHANGE ADDED TO ECC TABLES |
| 113537 | 06/23/1997 09:35 AM | BSLD GA ACCT 59 TERM DISCOUNT INCORRECT |
| 113538 | 06/23/1997 09:37 AM | BSLD GA ACCT 13, 59 NOT TAXING CORRECTLY |
| 123717 | 07/24/1997 08:50 AM | BSLD GA PCC INTERNATIONAL TO INTERNATIONAL CALLS SHOULD NOT BE TAXED |
| 128395 | 08/13/1997 02:39 PM | ACCOUNT CODES ARE BEING INCORRECTLY ASSIGNED FOR DA CALLS AND MIN. SETTLE. AMTS. |
| 128445 | 08/14/1997 11:15 AM | UBO – ISDN CUSTOMER NOT RECEIVING CALL ALLOWANCE IN SC |

Ready

FIGURE 6

Query – Problem Tickets

Q | List | Entities | Dates | Impact | Misc | Sort

Ticket Type: Problem    Owner: RAY, JEFF

| Name | Created | Modified | Last Run | # Hits (last run) |
|---|---|---|---|---|
| David Wheeler Test Query | 10-02-1998 | 10-02-1998 | 07-21-1999 | 11 |
| Gary's Ticket | 03-19-1998 | 03-19-1998 | 05-15-1999 | 0 |
| Gene's Default Query | 09-10-1998 | 09-10-1998 | 07-20-1999 | 0 |
| Joy Test | 02-02-2000 | 02-02-2000 | | |
| TTS User Delete Query – Problem Tickets | 07-26-1999 | 07-26-1999 | 08-04-1999 | 7 |
| test3 | 02-04-2000 | 02-04-2000 | 02-04-2000 | 38 |

Test | Set

Add | Delete | Edit | Save | Cancel | Copy | Print | Print All | Help | Close

FIGURE 7

TROUBLE TRACKING SYSTEM AND METHOD

BACKGROUND

1. Field of the Invention

The present invention is directed to issue tracking and resolution. More particularly, the present invention is directed to an automated trouble tracking system that receives stores and tracks "tickets" that represent particular problems or issues associated with a process or enterprise, and alerts an appropriate responsible party of an outstanding trouble ticket that needs attention.

2. Background of the Invention

Large service-oriented enterprises such as banks, insurance companies and telephone companies often establish separate divisions that are responsible for resolving computer, process, or customer problems or issues. For example, computer network problems might cause unacceptable computer downtime and thus must be resolved as soon as possible so that normal operations can proceed. A customer complaint, on the other hand, is a common example of a customer issue. A customer complaint, left unaddressed, may lead to the loss of that customer and thus a decrease in revenue. Accordingly, it is imperative that problems and issues that arise within a business setting be dealt with in a timely and proper manner.

Due to the large size of some organizations and the many customers they service, there is the potential for a large number of issues to arise. These organizations, therefore, often employ several people who can be mobilized individually or in groups to resolve the myriad of issues that can face a business. Managing these people so that the issues are resolved quickly and correctly, however, is a difficult task.

In response, some businesses have implemented issue management systems, often implemented via software, that are operable to receive issue or trouble "tickets." Specifically, these systems are designed to receive (and store in a database) a description of an issue, and to assign a ticket number to the description of the issue. The ticket number is used for tracking and resolution purposes. The basic data structure or record of a trouble ticket preferably includes a number of fields in which a user can enter data describing the issue. A trouble ticket number may then be transmitted by, e.g., an electronic mail system to the appropriate maintenance, repair or customer service personnel who are most qualified to resolve the issue. When the issue is resolved, the ticket is "closed out" and the ticket record is stored for later retrieval and analysis.

While the basic functionality of issue management systems has been implemented in the prior art, conventional issue management systems remain deficient in a number of ways. Specifically, even if an email message is sent to alert a responsible party that there is an outstanding trouble ticket, that person may not always have access to his email. Thus, if the problem is sufficiently severe, operations might have to be stopped until that person can be located, informed of the problem, and the problem resolved.

Also, conventional issue management systems are designed for use internally, i.e., within an organization. However, in recent times companies have decide to outsource or contract out various functions, particularly those in the areas of computer infrastructure and field personnel. Thus, it may be desirable to have a non-employee have access to the issue management system.

SUMMARY OF THE INVENTION

The present invention provides a world wide web enabled trouble tracking system (TTS) and method that communicates and tracks issues such as problems, inquiries, notifications and user acceptance testing (UAT) data. The trouble tracking system and method of the present invention includes functionality that improves significantly over conventional issue management systems.

More specifically, the present invention is geared to account for events or problems within a large organization or enterprise. The present invention is described herein using as the primary example the case of a large telephone company that, for example, includes a billing entity that is responsible for customer billing (including levying appropriate taxes and keeping track of rates and services). In the telephone company billing context four issues defined below are those that are tracked for the example of the present invention described herein, although it will be understood by those skilled in the art that any number or type of other issues may also be tracked with the present invention in a wide variety of large organizations.

"Problem"—event, which does not conform to "agreed-to" specifications, or results in incorrect billing, or results in corruption of, related processes. "Problems" are entered in the TTS and sent to the appropriate person(s) within or outside the company for resolution.

"Inquiry"—questions concerning customer accounts. Such questions originate, for example, via Customer Operational Units (COUs) (i.e., logical division of a company based on a type of customer, such as small business, consumer, etc., and their needs) and/or Enhanced Billing Services (EBS) (i.e., a specialized group that serves larger or more sensitive customers regarding their billing needs. Inquiries are entered into the TTS and passed on to the appropriate person or group for resolution.

"Billing Notifications"—special TTS tickets that produce word processing documents. These documents are preferably sent to at least one of a billing unit or COU. The documents provide information relating to, e.g., billing errors, recoveries, refunds and reruns.

"User Acceptance Testing" (UAT)—features or changes that have not yet been entered into production or implemented. A UAT ticket is entered when a UAT event does not conform to "agreed-to" specifications or could result in incorrect billing, or corruption of related processes. Once entered, UAT tickets are sent to the appropriate persons inside or outside the company, as necessary.

The present invention preferably comprises, at a high level, a client executable file and graphical user interface (GUI). Preferably, also incorporated are server-based components including an email system and a report creation and copying application, a duplicate ticket identification module and connectivity with an automatic paging system. Still further, the present invention preferably includes a portal through which the trouble tracking system's database can be accessed by outside contractors such as outsourced information technology (IT) personnel, whereby consistency between "local" and "offsite" databases can be maintained.

The present invention preferably includes a series of user interface screens that are accessible via the Internet (or an Intranet) using browser software such as Netscape or Microsoft Explorer. A user can add and update TTS tickets by adding and updating information in data fields presented on a display screen. For example, one user interface screen is used to add a new "problem" ticket to the database and includes a field for describing the problem encountered. This user interface screen also preferably includes a field for associating a severity level with the problem. If the severity level is high enough (i.e., above a predetermined threshold) the present invention preferably not only emails a notification of the problem to a "responsible" person, but also initiates a paging call to that person over a paging system.

Another user interface screen is dedicated to adding a new "inquiry" ticket.

Still another user interface screen is dedicated to adding a new "bill notification" ticket.

Other user interface screens include a query screen and a ticket summary screen. The ticket summary screen provides a listing of tickets, outstanding or closed, that are stored in the TTS database. The query and summary screens can be very useful as a management tool.

Another feature of the present invention is the implementation of a duplicate ticket identification function. When a problem is identified and a ticket is entered into the system of the present invention, it is possible that someone else might have already entered a ticket for an identical problem or someone will subsequently enter a ticket for an identical problem or issue. The later-entered ticket might have an identical description or may have a description that, while not identical, can nevertheless be considered to be the same ticket for purposes of resolution. To avoid overloading both the database of the trouble tracking system of the present invention and/or the resources of the personnel who must address and resolve the tickets, the present invention provides a module that (i) periodically screens the outstanding tickets in an effort to identify potential duplicates, (ii) makes available to a system administrator and/or responsible person a listing of the identified duplicates and (iii) permits deletion from the database of one or more duplicate tickets and/or flags the duplicate(s) so that it is no longer considered "open" and will be formally closed when the issue is resolved.

It is therefore an object of the present invention to provide a trouble tracking system and method for entering, tracking, identifying trends and resolving problems and issues.

It is another object of the present invention to provide specific tracking capability for problems, inquiries, billing notification and user acceptance testing.

It is yet another object of the present invention to provide a world wide web-enabled system and method that permits personnel from both within and outside an organization to have access to a trouble tracking system whereby local and offsite databases can remain consistent.

It is another object of the present invention to provide a trouble tracking system that includes a severity level indicator which, if above a certain threshold, causes a paging system to page a responsible party to alert that party of an outstanding trouble ticket.

It is also an object of the present invention to provide a trouble tracking system that searches for duplicate ticket entries and alerts a system user of any such duplicates so that the system user can delete any duplicates as desired, and/or flag them as duplicates.

It is a further object of the present invention to provide a simple graphical user interface to enter, track, determine trends in, and list trouble tickets.

It is also an object of the present invention to provide a trouble tracking system that generates reports.

These and other objects of the present invention will become apparent upon reading the following detailed description in conjunction with the accompanying drawings.

BRIEF DESCRIPTION OF THE DRAWINGS

FIG. 2 illustrates an exemplary new ticket input screen for a problem in accordance with the preferred embodiment of the present invention.

FIG. 3 illustrates an exemplary new ticket input screen for an inquiry in accordance with the preferred embodiment of the present invention.

FIG. 4 illustrates an exemplary new ticket input screen for bill notification in accordance with the preferred embodiment of the present invention.

FIG. 6 illustrates an exemplary ticket summary screen in accordance with the preferred embodiment of the present invention.

FIG. 7 illustrates an exemplary query screen in accordance with the preferred embodiment of the present invention.

DETAILED DESCRIPTION OF THE INVENTION

The present invention, the trouble tracking system (TTS), provides an automated or mechanized system and method to communicate, determine trends and track, e.g., problems, inquiries, notifications and user acceptance testing (UAT) data both within and outside an organization. The TTS facilitates the management and, thus, the final resolution of issues of concern such that the issues are resolved quickly and efficiently.

Figure 1:
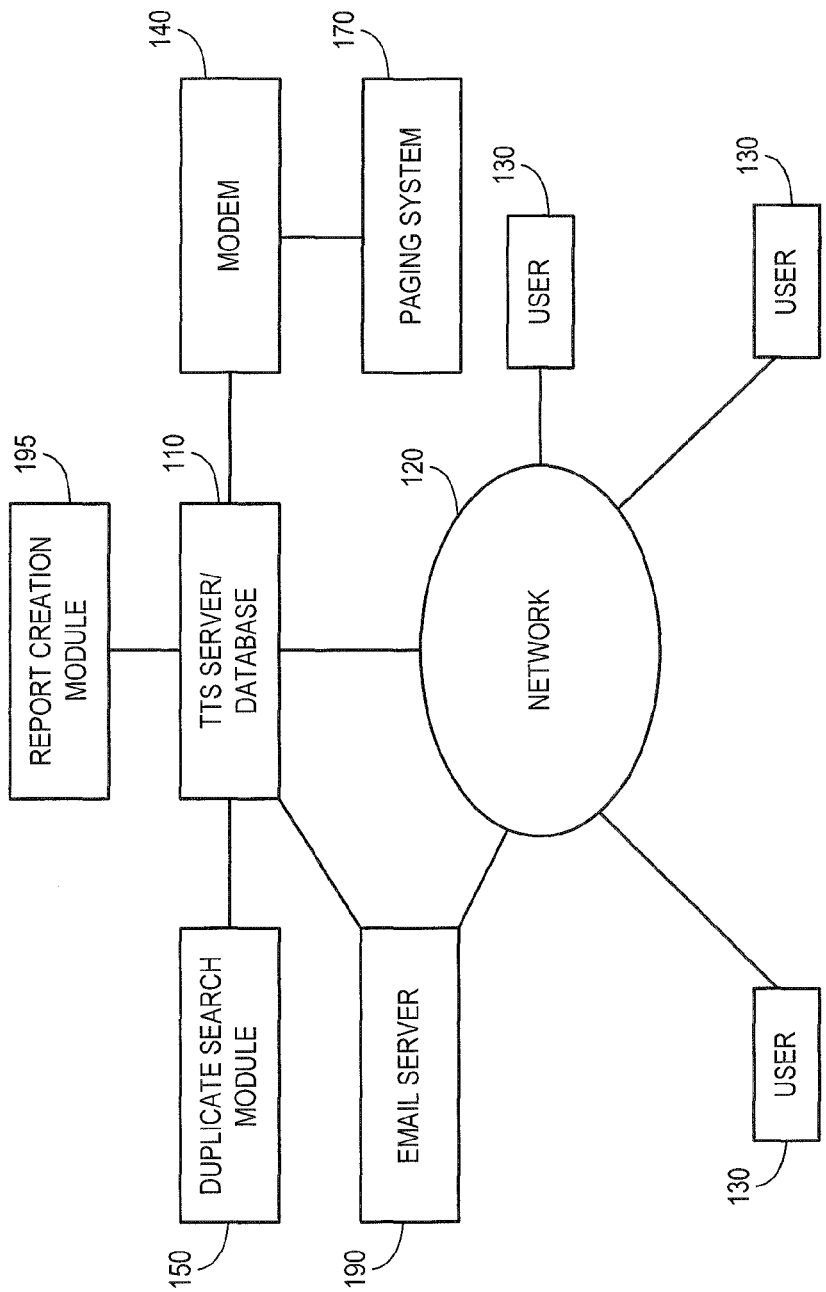
FIG. 1 is a schematic diagram of a preferred implementation of the present invention.

FIG. 1 illustrates a preferred arrangement for implementing the present invention. Specifically, a Trouble Tracking System (TTS) server and database 110 is connected to an electronic network 120, which can be a local area network, a wide area network, the Internet and most preferably a combination thereof. Although TTS server and database 110 are shown as a single unit, the server and database may be distributed and not even necessarily located in close proximity to each other. That is, the server and database 110 can themselves be interconnected via a network. In the following description, the TTS server and database are discussed as a single unit for convenience, but the present invention is not limited to this architecture. In a preferred embodiment, the server runs Microsoft Windows NT 4.0 and the database is a Sybase SQL server, version 11.0. TTS server and database 110 form the backbone of the TTS. As shown, several users 130 are also connected to network 120 via computers or terminals with displays whereby each user 130 has access to TTS server and database 110 via graphical user interface screens described in detail later herein.

Users 130 preferably are people who have the responsibility for dealing with issues arising in a business's operations. Such issues may be technical in nature, e.g., computer problems, or may be consumer related, e.g., customer complaints. Other issues might include errors that are caught before the results of the errors are passed on to consumers, e.g., errors on bills that have not yet been mailed. This latter type of error or issue is considered a User Acceptance Testing (UAT) issue.

Figure 2:
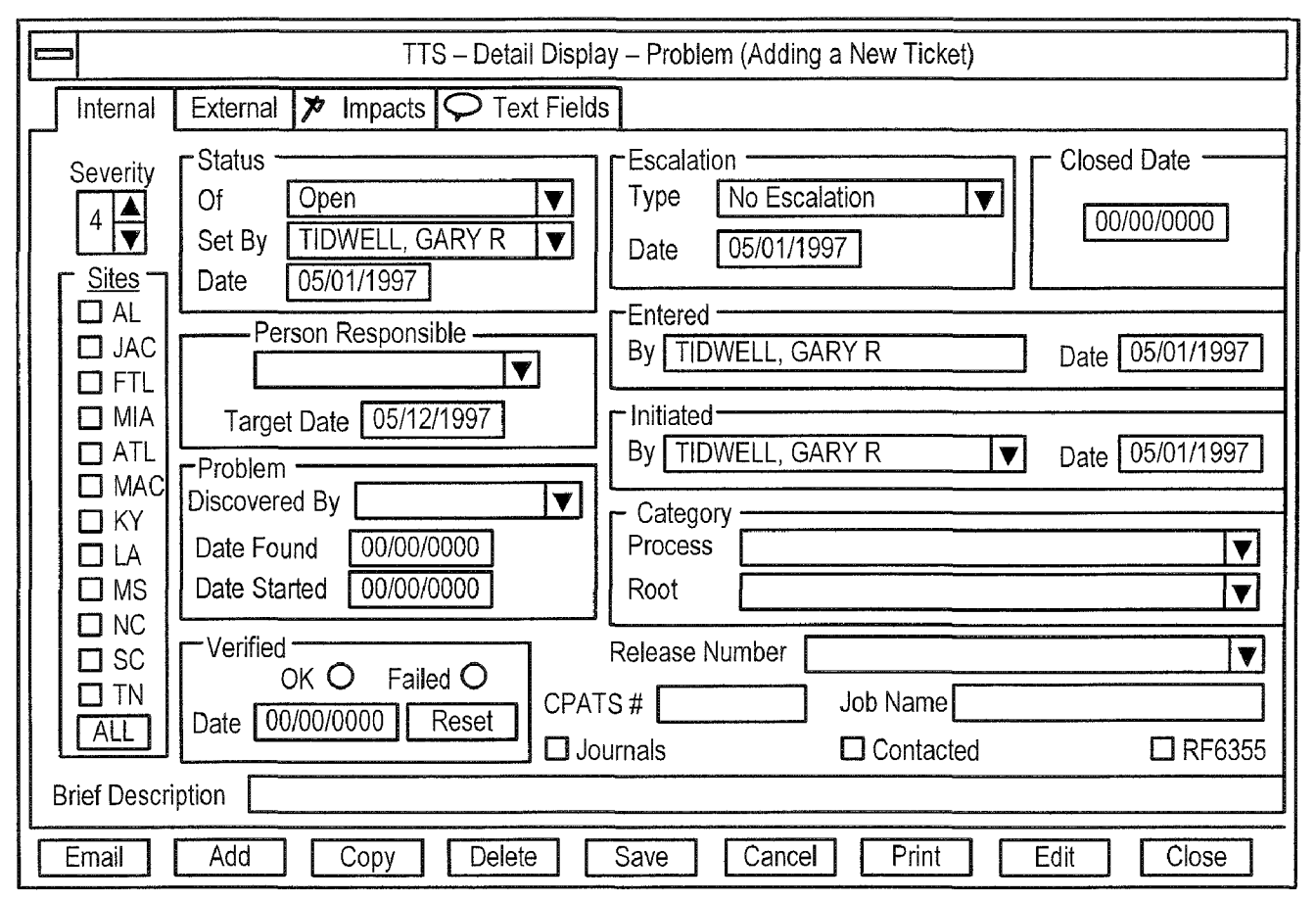

Once such a problem or issue is detected, a user 130 accesses TTS server and database 110 via network 120 and enters a description of the issue that has arisen. FIG. 2 shows an exemplary "problem" entry screen. For purposes of the screen of FIG. 2, a problem is defined as an event which does not conform to "agreed-to" specifications, or results in a breakdown of a process, e.g., billing.

More specifically, the screen of FIG. 2 has a "status" region that indicates the status of the ticket as either open, pending, rejected, diagnosed, approved, disapproved, duplicate, not repeatable, resolved or closed. The status region also includes a field for entering the person who set the status and the date on which the status was set. Also included is a "person responsible" field and a target date which corresponds to a date by which the ticket is to be resolved. Below that region of the screen is a "problem" region, which includes fields to indicate who discovered the problem, the date it was found, and/or the date the problem started. Beneath the "problem" region there is a "verified" region. The information in this region is used to indicate whether the resolution to the problem has been verified ("OK") or whether the resolution has "failed."

Towards the upper right of the screen of FIG. 2, there are regions for "escalation", i.e., whether the trouble ticket deserves attention at a higher level of management, and "closed date" which indicates when the ticket is closed, if at all. Below those regions are "entered by" and "initiated by" regions which identify the person or persons responsible for entering the information and/or initiating the entry of the information. Below those latter two regions, there is a region entitled "category," which preferably is used to identify the process in which the problem occurs and, more specifically, the root of that process. Also included are various other pieces of information that may be useful for ticket tracking purposes, such as "release number" for, e.g., software version, "CPATS #" for proprietary work request number, "journals" for indicating whether a certain group (e.g., the journals group) has been reported to, "contacted" (to denote if the problem has bee reported to the COUs) and "RF6355" (to denote if the problem was received as a certain kind of inquiry).

There is also space in the screen shown in FIG. 2 for entering a brief description of the problem. On the left-hand side of the screen, there is a "severity" field where the user can indicate, for example on a scale from 1–4, what the severity of the open or outstanding ticket is. Further, on the left-hand side of the screen of FIG. 2 is a region entitled "sites" for indicating which geographical sites associated with a business might be affected by the problem or issue that is being added to the trouble tracking system database.

At the bottom of the screen shown in FIG. 2 are a series of command buttons which include conventional functions such as adding, copying, deleting, saving, canceling, printing, editing and closing the screen or information entered in the screen, as the case may be. On the left-hand side of the command buttons is the command button "e-mail". If the e-mail button is depressed, then the person indicated in the field in the "person responsible" region is automatically e-mailed with an alert that an outstanding ticket has been assigned to that person. More preferably, an email message is automatically created and sent when a ticket is initially created. The email button may then be used when a change is made to a ticket and the change is determined to be significant. Preferably the present invention includes a lookup table (or a link thereto) listing the possible persons who might be indicated as a "person responsible" and their respective email addresses. FIG. 1 schematically illustrates e-mail server 190 connected both to TTS server and database 110 and network 120 to effect the e-mail function of the present invention.

Also connected to TTS server and database 110 is a modem 140, which is further, connected to a paging system 170. In accordance with the present invention, when the severity level indicated in the severity field in the upper left-hand corner of the screen of FIG. 2 is above a certain threshold, e.g., 3, the person indicated as the "person responsible" is also automatically paged. Though not shown, the present invention also preferably includes a lookup table (or a link thereto), which matches the possible responsible persons with their paging numbers, whereby when the severity level is above the threshold, the paging function is automatically launched. The page preferably includes text information including the trouble ticket number. Those skilled in the art will appreciate that paging may also be effected without the use of a modem.

FIG. 3 illustrates a new ticket input screen for an inquiry. In this case, there are fewer regions to complete since an inquiry is a trouble ticket that is initiated from an outside source and, thus, it is usually irrelevant who discovered and/or initiated the problem in the first place. The field "AI validation" in FIG. 3 preferably indicates whether the a billing department, for example, is actually responsible for resolving the ticket, i.e., is the ticket valid for a particular department.

Figure 4:
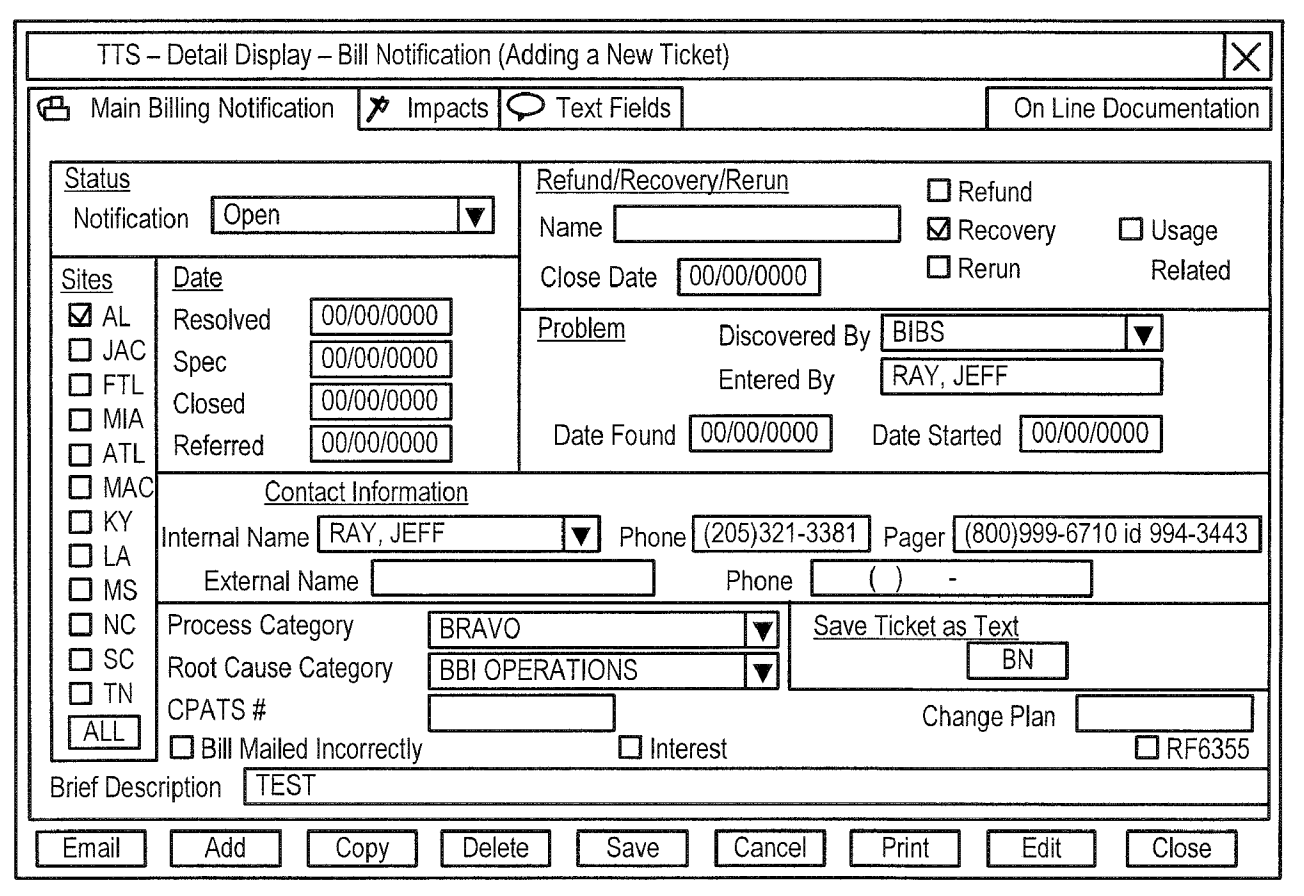

FIG. 4 is a screen that preferably is used to add a new ticket for bill notification. In this case, there are fields directed to bill notification-specific information, such as whether the ticket is related to a refund, recovery, rerun or usage.

Figure 5:
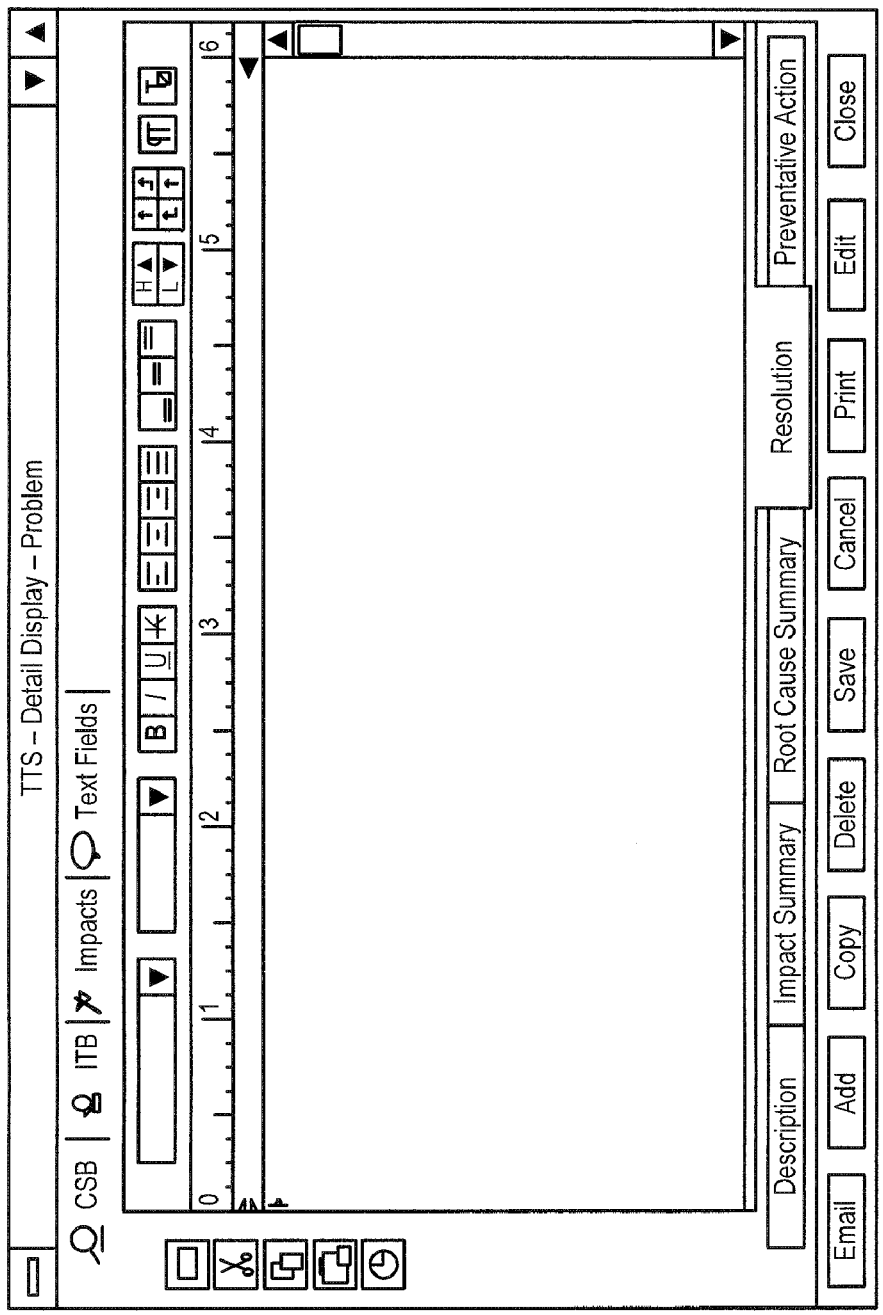
FIG. 5 illustrates an exemplary problem resolution screen in accordance with a preferred embodiment of the present invention.

FIG. 5 illustrates an exemplary problem resolution screen in accordance with the preferred embodiment of the present invention. This screen is accessed via the "Text Fields" tab at the top of the screen. As can be seen near the bottom of the screen of FIG. 5, text boxes are available for several fields of a trouble ticket record. FIG. 5 illustrates a resolution field in which a user details how, e.g., a problem was resolved.

FIG. 6 illustrates a ticket summary screen in accordance with a preferred embodiment of the present invention. In this screen, each of the tickets is ordered by ticket number (ID), its entry date, and its brief description. Accordingly, a user 130 can easily search through the different types of tickets based on, if desired, a query, which can be set to filter and order tickets by "person responsible" or any other searchable field of the trouble ticket record, e.g., specific dates. In a preferred embodiment, the summary screen of FIG. 6 is the default screen of the TTS and is displayed first when initially logging on to the system.

FIG. 7 shows a listing of saved queries. The other tabs at the top of this exemplary screen may be selected to display tickets in accordance with different criteria, e.g., by which entity the ticket is related, date, what type of impacts the ticket might have on other systems/processes, by miscellaneous criteria or in accordance with selected sorting criteria (none are shown, but are all easily implemented by those skilled in the art using well-known database manipulation techniques).

Figure 8A:
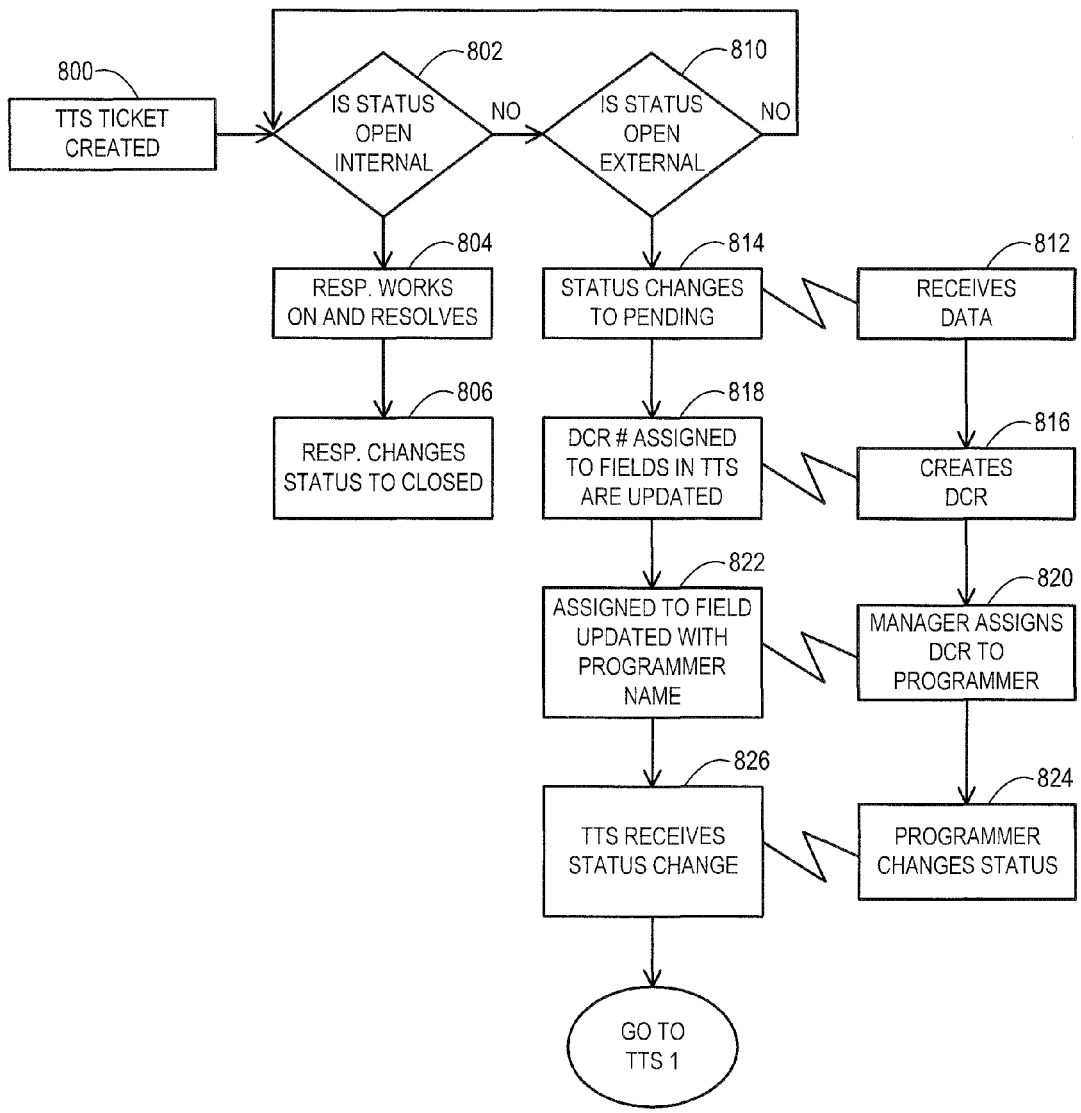
FIGS. 8A–8C are flowcharts illustrating a preferred implementation of the trouble tracking system of the present invention.
Figure 8B:
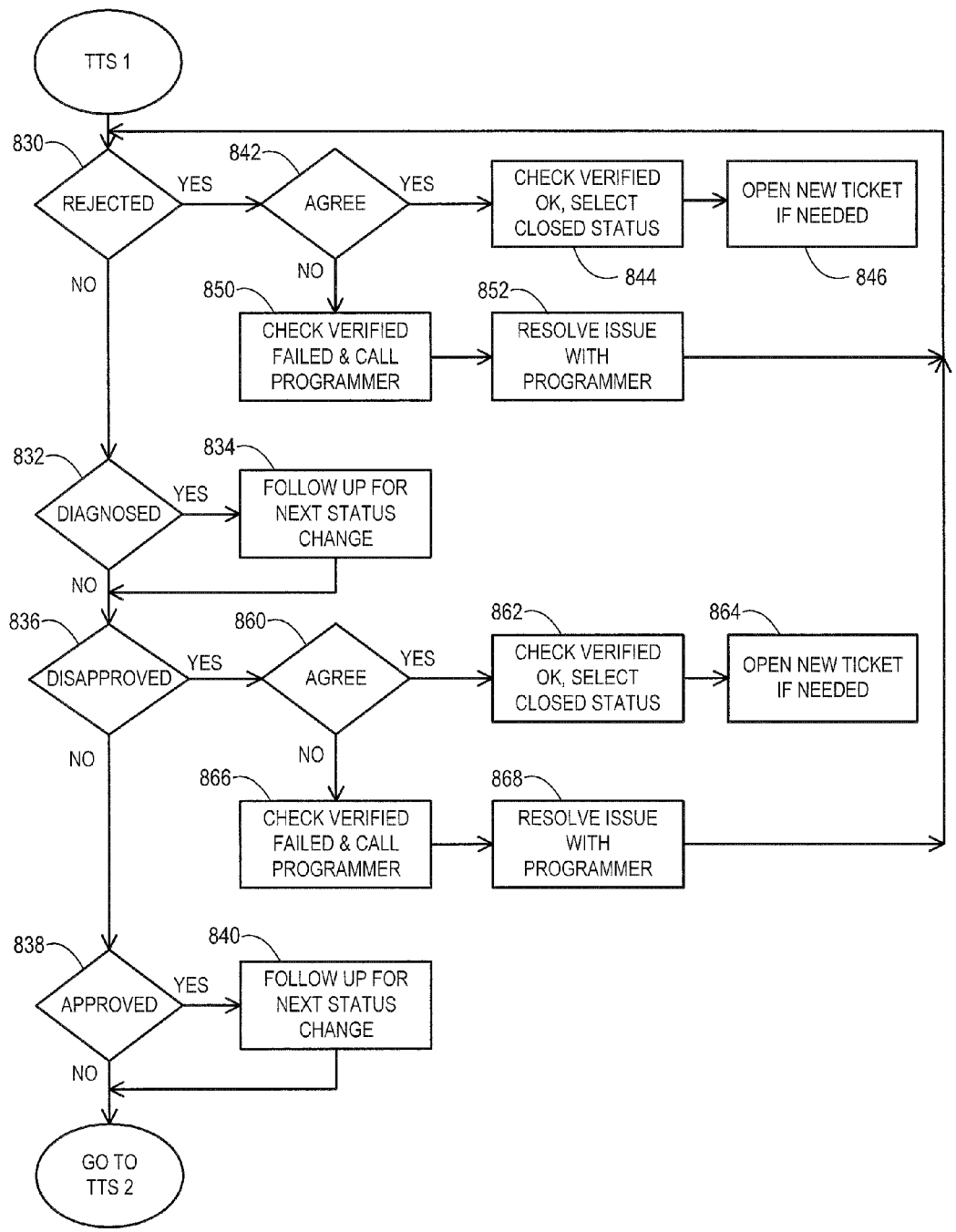
Figure 8C:
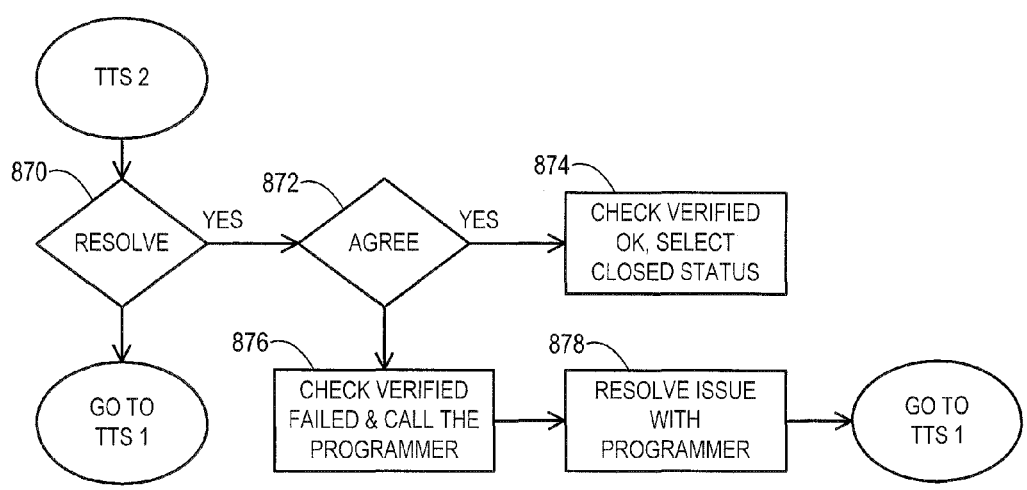

FIGS. 8A–8C are flow charts illustrating a preferred implementation of the trouble tracking system of the present invention. The flowcharts depict the case of both internal and external/outsourced trouble ticket management, and specifically for the case of an outsourced information technology (IT) group. In the following discussion, "internal" or internal person/personnel refers to the organization that controls the TTS, while "outsourced personnel/organization" refers to the external or outsourced IT organization.

Referring to FIGS. 8A–8C, a TTS ticket is created at step 800 by, for example, inputting a new problem ticket via a screen such as the screen shown in FIG. 1. At step 802, it is determined whether there is a ticket having a status of "open internal." That is, it is determined whether the ticket created at step 800 is still outstanding. If there is a ticket that is outstanding and is open to internal personnel, then at step 804 an internal employee works on and resolves the problem described by the ticket. Once the ticket has been properly resolved, the status of the ticket is changed to closed as shown at step 806.

If the ticket that was entered at step 800 was a ticket that should be assigned to outsourced personnel, then it is determined at step 810 whether there is an open external ticket that is meant for the outsourced organization. If not, then the process returns to step 802 to determine if there are any other open tickets. This loop continues for as long as the system is running. If there is an open ticket assigned to an outsourced organization, then after the trouble ticket record is received by the outsourced organization, step 812, the process proceeds to step 814 where the status field in the ticket record is changed to "pending." In accordance with the present invention, the outsourced organization preferably is given access to the trouble tracking system server and database 110 so that the outsourced organization can receive assigned "open" tickets and update trouble tracking system database and server 110 in an appropriate manner. Access to TTS server and database 110 is preferably implemented via a world wide web portal that the outsourced organization can reach via the Internet. Thus, the outsourced organization preferably monitors TTS server and database 110 for tickets that have been assigned to the outsourced organization and have status fields of "open."

When an "open" status is detected, the outsourced organization receives the data associated with the ticket, i.e., the description of the problem and any other desired information, and loads that information into its own management system. Status is then changed to "pending" at step 814. Thereafter, at step 816, the outsourced organization creates a Defect Change Request (DCR) and transmits that DCR to the TTS server and database 110. At that point, as shown at step 818, TTS server and database 110 updates the "assigned to" field so that the internal personnel have a tracking number with which to coordinate with the outsourced organization.

At step 820, as shown in FIG. 8A, a manager in the outsourced organization assigns the DCR to a particular programmer. This information is then transmitted to TTS server and database 110 and the programmer's name is then added to the appropriate field, as shown in step 822. When the programmer, in step 824, changes the status of the ticket, that information is transmitted to and received by TTS server and database 110 at step 826.

FIG. 8B illustrates a verification process with respect to an allegedly resolved ticket. Specifically, at step 830 it is determined whether the outsourced organization has rejected the ticket altogether. That is, the outsourced IT organization might not believe that the problem described by the ticket is its responsibility or fault. If the ticket was not rejected by the outsourced organization, then at step 832 it is determined if the problem described in the ticket was properly diagnosed. If yes, then at step 834, the status of the ticket is appropriately changed to "diagnosed".

If the problem was not properly diagnosed, then at step 836, the outsourced organization may "disapprove" the ticket as, for example, being assigned to the wrong group within the outsourced organization. If the problem was diagnosed and not disapproved, then the process continues to step 838 where the internal personnel approve of the disposition or resolution of the ticket. If so, at step 840 the status of the ticket is changed to "resolved".

Returning to step 830, if the outsourced organization indicated that it believed that the ticket is not an IT problem, then the process proceeds to step 842. If the internal personnel agree with IT's assessment, then at step 844 "OK" is checked in the "verified" region of FIG. 1, for example, and at step 846, a new ticket is opened if needed. If at step 842, the internal personnel do not agree that the problem is not an IT problem, then the "failed" indicator is checked in the "verified" region of FIG. 1 and at step 852 the programmer, who is indicated as being responsible for resolving the issue, is contacted and the ticket is discussed with that programmer to attempt to resolve the issue. The process then returns to step 830.

If at step 836 the outsourced organization believes that the ticket was assigned to the wrong IT group or area, then the internal personnel proceed with steps 860, 862, and 864, or 866 and 868 which are similar to steps 842–852, discussed above.

FIG. 8C depicts steps 870–878. The steps of FIG. 8C follow step 838 or step 840 of FIG. 8B and are invoked if a ticket has been resolved or has been properly rejected or disapproved by the outsourced organization. The process of FIG. 8C starts with step 870 wherein, if the ticket has not been properly resolved for any reason, then the process returns to step 830, i.e., the top of FIG. 8B. On the other hand, if the issue or problem has been resolved, then at step 872, the internal personnel have the chance to agree or disagree with the final resolution. If there is agreement with the resolution, then the "OK" indicator is checked in the "verified" region of FIG. 1, as shown in step 874, and if there is disagreement with the final resolution, then at step 876, the "failed" indicator is checked in the "verified" region of FIG. 1. Thereafter, the programmer that is responsible for resolving the issue is contacted, as shown in step 878 and the issue is resolved with the programmer and the process returns to step 830, i.e., the top of FIG. 8B. Ultimately, the status of the ticket will be changed to "closed".

Thus, as shown in FIGS. 8A–8C, the present invention continuously checks for new tickets and, when the ticket is assigned to an outsourced organization, is capable of effectively tracking the progress and ultimate resolution of that ticket even though the "person responsible" is not an internal employee.

Another feature of the present invention is that of duplicate ticket identification, a feature that has significant advantages. For example, a large telephone company might mail thousands of bills in a single billing period. If a program error causes bills to be incorrect, then it is not unlikely that many customer complaints might be received. While each of the customer bills must be corrected, each instance of which could be entered in the TTS, there is only a single instance of the computer program bug which must be corrected. Thus, only a single ticket should be assigned to a "person responsible" to resolve the computer error. However, several tickets might be entered into the TTS by different people (e.g., different customer service representatives) before it is realized that multiple tickets are being assigned for the same problem.

In accordance with the present invention a duplicate ticket module or search engine 150 is in communication with the database of the TTS server and database 110. To avoid overloading both the database of the TTS and/or the resources of the personnel who must address and resolve the tickets, the present invention provides a module 150 that (i) periodically screens the outstanding tickets in an effort to identify potential duplicates, (ii) makes available to a system administrator and/or responsible person a listing of the identified duplicates and (iii) permits deletion from the database of one or more duplicate tickets or flags the duplicate(s) so that it is no longer considered "open" and will be formally closed when the issue is resolved. Duplicate search module 150 may run SQL searches on the database to try to identify duplicate strings in the description field duplicate "person responsible" and/or dates that tickets were added.

If an exact or potential duplicate ticket is identified, then those tickets are either saved in a separate file and/or displayed for a user of the TTS, e.g., via a query. The user preferably has the ability to delete a confirmed duplicate or, most preferably, the user has the ability to "flag" one or more of the duplicates, leaving a single ticket that represents all the duplicates. A flag field (not shown) preferably includes the ticket number of the representative ticket and when the representative ticket is closed, the duplicate tickets will likewise be closed.

The present invention preferably also includes a report creation module 195. Several different reports can be run based on the data (tickets) in the TTS database. These reports are useful for tracking and trending tickets that have been assigned to people throughout an organization and are extremely helpful as management tools. Although shown as a separate unit, report creation module 195 may be incorporated in the same computer as TTS server and database 110.

In the preferred embodiment of the present invention, six reports are preferably available through report creation module 195:

Manager Reports—provides ticket information relevant to each manger group. This report preferably includes various reports for those tickets "entered" and/or "assigned" to a particular manger group.

Escalation Reports—these reports provide information regarding escalation candidates and tickets escalated, i.e., tickets that have not been timely resolved and thus have been escalated in severity.

Notification Reports—provide information relative to billing notification, recoveries, refunds and billing reruns.

Ticket Reports—these reports are either detailed or in a listing.

Inquiry Reports—preferably include three options: generate last month's numbers, generate all reports and generate individual reports.

Maintenance Reports—prints the current User list and is used primarily for administrative purposes.

The foregoing reports preferably are created as desired via SQL searches and printed or displayed in a format that conveys the information quickly and clearly.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A trouble tracking system, comprising:

a server in communication with an electronic network;

a database in communication with the server, the database storing a plurality of trouble tickets;

a user computer in communication with the network and having access, via a graphical user interface (GUI), to the server, the graphical user interface including at least one screen, the screen being operable to manually enter a new trouble ticket along with (i) a person responsible for resolving the ticket, (ii) a severity level for the trouble ticket with the severity being indicated as a number on a scale between an initial number indicating a lowest severity and a last number indicating a highest severity wherein the number is manually entered via the GUI and is fixed until being manually changed via the GUI, (iii) an indication that a status of the trouble ticket has been escalated where the trouble ticket has not been timely resolved such that a higher level of management is required wherein the indication that a status of the trouble ticket has been escalated is manually entered via the GUI and is fixed until being manually changed via the GUI, (iv) an identifier of a process in which a problem has occurred that has necessitated the trouble ticket, an identifier of a root of the process in which the problem has occurred; and wherein the screen is further operable to store the trouble ticket in the database;

a duplicate ticket module in communication with the database wherein the duplicate ticket module periodically screens the trouble tickets to identify one or more duplicate trouble tickets, flags the one or more duplicate trouble tickets to associate the one or more duplicate trouble tickets, detects closure of a ticket flagged as a duplicate, and closes all of the one or more duplicates that are associated with the closed ticket;

a paging system, in communication with the server, wherein when the severity level associated with the trouble ticket is above a predetermined threshold number on the scale, the server automatically initiates a call to the person responsible via the paging system; and means for communicating with and sharing trouble ticket data with an organization that operates under outside contract, the organization assigning its own tracking number to a given trouble ticket, the tracking number being stored in the database of the trouble tracking system, wherein the database stores information relating to whether an attempted resolution of a trouble ticket by outsourced personnel who work for the organization has been approved by internal personnel for whom the outsourced personnel are working and wherein the trouble ticket is designated as closed within the database upon the information relating to approval being provided by the internal personnel and indicating that the resolution is approved.

2. The trouble tracking system of claim 1, further comprising an email server, wherein the email server automatically sends an email message to the person responsible for resolving the ticket and the email message includes at least a trouble ticket number.

3. The trouble tracking system of claim 1, further comprising a report creation module, the report creation module being operable to generate reports based on the plurality of trouble tickets stored in the database.

4. The trouble tracking system of claim 1, wherein the duplicate ticket module lists at least one pair of the actual or potential duplicate trouble tickets.

5. The trouble tracking system of claim 1, wherein the trouble tickets comprise at least one of a problem, an inquiry, a bill notification and a user acceptance data issue.

6. The trouble tracking system of claim 1, wherein the database further stores status information.

7. The trouble tracking system of claim 1, wherein the database further stores information associating a trouble ticket to a geographical region.

8. The trouble tracking system of claim 1, wherein the network comprises the Internet.

9. A system for managing issue resolution, comprising:
a plurality of computers interconnected in a network, one of the computers including a trouble ticket database and an executable program for accessing and updating the database and each of the computers having access to a graphical user interface (GUI), the GUI including at least one screen operable to add a new trouble ticket to the database, each trouble ticket including at least (i) a description of the an issue, (ii) a person responsible for resolving the issue and (iii) a severity level of the issue with the severity level being indicated as a number on a scale between an initial number indicating a lowest severity and a last number indicating a highest severity wherein the number is manually entered via the GUI and is fixed until being manually changed via the GUI, (iv) an indication that a status of the trouble ticket has been escalated because the trouble ticket has not been timely handled and requires a higher level of management wherein the indication that a status of the trouble ticket has been escalated is manually entered via the GUI and is fixed until being manually changed via the GUI;
a duplicate ticket module in communication with the database wherein the duplicate ticket module periodically screens the trouble tickets to identify one or more duplicate trouble tickets, flags the one or more duplicate trouble tickets to associate the one or more duplicate trouble tickets, detects closure of a ticket flagged as a duplicate and closes all of the one or more duplicates that are associated with the closed ticket;
an email system in communication with the executable program, the executable program automatically emailing a trouble ticket number to the person responsible for resolving the issue;
a paging system, the paging system automatically paging the person responsible for resolving the issue based on whether the trouble ticket has been escalated when the severity level of the trouble ticket is above a predetermined threshold;
means for communicating with and sharing trouble ticket data with an organization that operates under outside contract, the organization assigning its own tracking number to a given trouble ticket, the tracking number being stored in the database,
wherein the organization updates the database, and
wherein the database stores information relating to whether an attempted resolution of a trouble ticket by outsourced personnel who work for the organization has been approved by internal personnel for whom the outsourced personnel are working and wherein the trouble ticket is designated as closed within the database upon the information relating to approval being provided by the internal personnel and indicating that the resolution is approved.

10. The system of claim 9, wherein the paging system transmits the trouble ticket number.

11. The system of claim 9, wherein the screen operable to add a new trouble ticket includes fields for indicating the status of the trouble ticket and closed date of the trouble ticket.

12. The system of claim 9, wherein the trouble ticket is associated with a geographical area.

13. The system of claim 9, wherein the trouble ticket is one of a problem, an inquiry, a bill notification and user acceptance testing data.

14. The system of claim 9, further comprising a duplicate trouble ticket module.

15. The system of claim 9, further comprising a report creation module.

16. The system of claim 9, wherein the database is accessible via the Internet.

17. A method for tracking trouble tickets, comprising the steps of:
providing a trouble ticket database;
screening the database to identify one or more duplicate trouble tickets;
flagging the one or more duplicate trouble tickets as a closed ticket;
generating a list of duplicate trouble tickets;
accessing, via a network, a graphical user interface (GUI), the graphical user interface including at least one screen, the screen being operable to enter a new trouble ticket along with (i) a person responsible for resolving the trouble ticket, (ii) a severity level for the trouble ticket, and to store the trouble ticket in the database and (iii) the severity level being indicated as a number on a scale between an initial number indicating a lowest severity and a last number indicating a highest severity wherein the number is manually entered via the GUI and is fixed until being manually changed via the GUI, (iv) an indication that a status of the trouble ticket has been escalated for failure to be handled within a prescribed time wherein the indication that a status of the trouble ticket has been escalated is manually entered via the GUI and is fixed until being manually changed via the GUI;
paging the person responsible based on whether the trouble ticket has been escalated when the severity level associated with the trouble ticket is above a predetermined threshold;
communicating with and sharing trouble ticket data with an organization that operates under outside contract, the organization assigning its own tracking number to a given trouble ticket, the tracking number being stored in the trouble ticket database, and
storing in the trouble ticket database information relating to whether an attempted resolution of a trouble ticket by outsourced personnel who work for the organization has been approved by internal personnel for whom the outsourced personnel are working and wherein the trouble ticket is designated as closed within the database upon the information relating to approval being provided by the internal personnel and indicating that the resolution is approved; and
analyzing the trouble tickets to determine whether duplicates of a first trouble ticket exist, flagging the duplicates to associate them with the first trouble ticket, detecting when the first trouble ticket has closed, and closing the flagged duplicates in response to detecting that the first trouble ticket has closed.

18. The method of claim 17, further comprising emailing the person responsible with at least a trouble ticket number.

19. The method of claim 17, further comprising creating a report based on a plurality of trouble tickets stored in the database.

20. The method of claim 17, further comprising searching the database for duplicate trouble tickets.

21. The method of claim 17, wherein the trouble tickets comprise at least one of a problem, an inquiry, a bill notification and a user acceptance data issue.

22. The method of claim 17, further comprising storing status information.

23. The method of claim 17, further comprising storing information associating a trouble ticket to a geographical region.

24. A method for managing issue resolution, comprising the steps of:

connecting a plurality of computers in a network, one of the computers including a trouble ticket database and an executable program for accessing and updating the database and each of the computers having access to a graphical user interface (GUI), the GUI including at least one screen operable to add new trouble ticket to the database, each trouble ticket including at least (i) a description of an issue, (ii) a person responsible for resolving the issue and (iii) a severity level of the issue with the severity level being indicated as a number on a scale between an initial number indicating a lowest severity and a last number indicating a highest severity wherein the number is manually entered via the GUI and is fixed until being manually changed via the GUI, (iv) an indication that a status of the trouble ticket has been escalated for failure to be handled within a prescribed time wherein the indication that a status of the trouble ticket has been escalated is manually entered via the GUI and is fixed until being manually changed via the GUI, (v) a field that receives a manually entered identifier of a process in which a problem has occurred that has necessitated the trouble ticket, (v) a field that receives a manually entered identifier of a root of the process in which the problem has occurred;

screening the trouble ticket database to identify one or more duplicate trouble tickets;

flagging the one or more duplicate trouble tickets to associate them together;

generating a list of duplicate trouble tickets;

detecting that one of the duplicate trouble tickets has been closed;

in response to the one of the duplicate trouble tickets being closed, closing the duplicate trouble tickets associated to it;

emailing a trouble ticket number to the person responsible for resolving the issue based on whether the trouble ticket has been escalated;

automatically paging the person responsible for resolving the issue based on whether the trouble ticket has been escalated when the severity level of the trouble ticket is above a predetermined threshold;

communicating with and sharing trouble ticket data with an organization that operates under outside contract, the organization assigning its own tracking number to a given trouble ticket, the tracking number being stored in the database, wherein the organization updates the database, and storing in the database information relating to whether a resolution of an attempted trouble ticket by outsourced personnel who work for the organization has been approved by internal personnel for whom the outsourced personnel are working and wherein the trouble ticket is designated as closed within the database upon the information relating to approval being provided by the internal personnel and indicating that the resolution is approved.

25. The method of claim 24, further comprising transmitting the trouble ticket number in the paging step.

26. The method of claim 24, further comprising storing a status of the trouble ticket and a closed date of the trouble ticket.

27. The method of claim 24, further comprising associating the trouble ticket with a geographical area.

28. The method of claim 24, wherein the trouble ticket is one of a problem, inquiry, a bill notification and user acceptance testing data.

29. The method of claim 24, further comprising searching for duplicate trouble tickets.

30. The method of claim 24, further comprising creating a report based on a plurality of trouble tickets.

31. The method of claim 24, further comprising accessing the database via the Internet.

* * * * *